United States Patent [19]

Power et al.

[11] Patent Number: 4,805,402
[45] Date of Patent: Feb. 21, 1989

[54] METHOD AND APPARATUS FOR SEALING ROCKET MOTOR SEGMENT JOINTS

[76] Inventors: Bernard A. Power; Mark B. Power, both of 255 Touzin Avenue, Dorval, Quebec, Canada, H9S 2N1

[21] Appl. No.: 897,728
[22] Filed: Aug. 18, 1986
[51] Int. Cl.[4] .............................. F02K 9/34; F02K 9/00
[52] U.S. Cl. ............................................ 60/253; 60/251
[58] Field of Search ...................... 60/251, 253, 255; 285/331, 337, 351; 277/3, 26, 27, 70, 71, 72 R, 72 FM, 79

[56] References Cited

U.S. PATENT DOCUMENTS

| 874,390 | 12/1907 | Carel | 285/331 |
|---|---|---|---|
| 3,291,490 | 12/1966 | Balmer | 277/72 |
| 3,514,132 | 5/1970 | Peabody | 285/331 |
| 3,649,052 | 3/1972 | Snyder, Jr. | 285/331 |
| 4,106,779 | 8/1978 | Zabcik | 285/331 |
| 4,222,576 | 9/1980 | Clements | 285/331 |
| 4,384,726 | 5/1983 | Meyer | 277/72 |
| 4,407,533 | 10/1983 | Giebeler | 285/351 |
| 4,416,472 | 11/1983 | Fouler et al. | 285/351 |
| 4,451,046 | 5/1984 | Bliven | 277/72 |
| 4,463,972 | 8/1984 | Weinhold | 285/331 |
| 4,569,540 | 2/1986 | Beson | 285/351 |
| 4,726,689 | 2/1988 | Pollock | 277/79 |

FOREIGN PATENT DOCUMENTS 2935755 3/1981 Fed. Rep. of Germany ...... 285/351
2077379 12/1981 United Kingdom ................ 285/351

OTHER PUBLICATIONS

Kolcum, Edward H.; *Aviation Week and Space Technology,* "NASA Selects Design Options for Shuttle Joints", pp. 18-19, July 7, 1986.

*Primary Examiner*—Carlton R. Croyle
*Assistant Examiner*—Timothy S. Thorpe

[57] ABSTRACT

An apparatus is described for sealing segment joint crevices is a segmented, solid rocket motor comprising, one or more O-rings or gaskets and associated seating channels, said O-rings being adapted to be seated into the joint crevice outwardly, except the outermost O-ring which is adapted to seat inwardly into the joint crevice.

A method is described for seating said O-rings or gaskets comprising, applying a sequence of pressure evacuations, or of pressure excesses and one pressure evacuation, to the joint crevice between the pairs of O-rings through vent access ports, and then sealing off the vent ports.

2 Claims, 2 Drawing Sheets

METHOD AND APPARATUS FOR SEALING ROCKET MOTOR SEGMENT JOINTS

This invention relates to a method and apparatus for sealing rocket motor segments joints by means of gaskets, for example by O-rings, and protecting them from becoming unseated during rocket motor ignition or during flight.

Conventional seals and seal configurations serve to prevent the escape of hot rocket motor gases and flame through the joints between motor segments on those rocket motors which are made up of several motor segments. These gaskets or seals are typically O-rings or C-rings which seat outward in the joint crevice to be sealed, that is they seat into the joint crevice in the direction of the exterior orifice of the crevice. However, these ring gaskets occasionally become unseated during motor ignition, or even later on during rocket flight, and the resulting escape of hot gas and flame through or around an unseated or failed gasket can cause destruction of the rocket motor, and of the associated space craft components, as for example, was the case with space shuttle Challenger of NASA Flight 51-L, Jan. 28, 1986 (Ref. 1).

The cause of this unseating of the O-rings in the solid rocket booster (SRB) motor of Challenger, or their failure to seat properly, has conventionally been described as being due to cold weather at launch time making the O-rings' rubber-like material too stiff or inflexible, together with unseating tendencies associated with the flexing of the rocket motor joints - a process which is called "joint rotation" (Ref. 1).

However, it will be shown here that the basic cause of the initial unseating of the O-ring in the joint lies, not with cold temperatures before and at launch, but with a dynamic shock wave emanating from the main liquid fuel engine exhaust at start up which causes a momentary, powerful, inwardly directed pressure on the external side of the seated, secondary O-ring in the solid rocket booster joint which unseats the O-ring just prior to the ignition of the SRB itself.

The problem with conventional seals and the invention to overcome it will be illustrated by reference to the following Figures.

Figure 1:
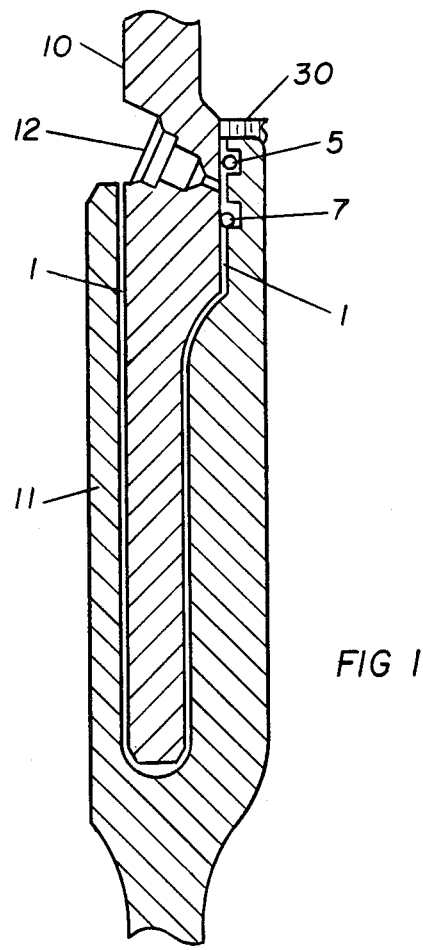
FIG. 1 is a cross-sectional view of the conventional sealing arrangement in the solid rocket booster motors of Challenger.

The problem with conventional O-ring installations is illustrated more particularly in FIG. 1 which shows in general cross-sectional view the essential features of the space shuttle's SRB seals, for example those on Challenger Flight 51-L's aft segment joint. This shows the mating tang 10 of the joint mid-section and clevis 11 of the aft segment, the joint crevice to be sealed 1, two O-ring seals 5 and 7, and heat resistant putty 30 on the inside of the O-ring 5 which is designed to both transmit gas pressure to the O-ring 5 from the rocket motor when ignited and, at the same time, to prevent direct contact of hot gas and flame with the O-ring 5. The redundancy in number of O-rings is designed to provide necessary reliability in sealing and safety.

FIG. 1 shows the condition of the joint prior to ignition of the SRB motor. The outer, secondary O-ring 7 is shown properly seated outwardly into the joint crevice 1; this seating is accomplished during rocket motor assembly by the application of air pressure, for example of 100 to 200 lbs. per sq. in, into the joint crevice through leak test port 12. This seating air pressure pushes the second O-ring 7 towards the exterior of the crevice to seat the ring properly outward in the crevice. This same action pushes the primary O-ring 5 inward in the joint crevice leaving it improperly seated inward or unseated. Upon ignition of the SRB, the internal rocket motor gas pressure will then press outward against the putty 30 and the primary O-ring 5, seating the O-ring correctly outward into the joint crevice 1 and sealing it. The already-seated, secondary O-ring 7 provides redundant sealing against any undue delay in this seating of the primary O-ring 5, which typically takes place in less than a second, for example within 600 milliseconds after SRB ignition.

If, as in Challenger 51-L, for example, the secondary seal 7 functioned as designed, the primary O-ring 5 would be open for a fraction of a second after solid rocket motor ignition, and this could allow a momentary passage of the hot gases around O-ring 5 before its seating took place. During this moment of time the seated, secondary O-ring 7 would limit the passage of flame and gas past the primary O-ring 5, which would then quickly close before appreciable or unacceptable thermal damage took place.

On the other hand, if, before the SRB is ignited, there occurred an external, inwardly-directed pressure surge of sufficient magnitude directed at the external orifice of the joint crevice 1, then it is obvious that the secondary O-ring 7 would at once become unseated, and would then be in a state or position to permit blow-by of the hot gas and flame after the SRB rocket motor was ignited, and before the unseated, primary O-ring became seated. The initial blow-by would then be much more serious than if the secondary O-ring 7 were still properly seated; the thermal erosion or burning away of the primary O-ring 5—and possibly even of the secondary O-ring 7—will then be much more extensive, and could conceivable, in this case, lead to complete burnthrough and failure of either or both O-rings. An O-ring which does not erode completely will eventually seat to seal the joint crevice 1 again, as the build-up of the rocket motor's internal pressure reaches a value sufficient to force the ring back into the joint crevice; but the initial thermal damage to the O-ring will make it more susceptible to becoming unseated later in the flight.

The source of such an external, momentary pressure surge which would unseat an already-seated, secondary O-ring 7, lies in a dynamic, reflected shock wave which is set up in the hot gas of the main, liquid-fuel rocket engine exhaust at start-up. In the space shuttle Challenger, for example, this main engine system is ignited about 6.6 seconds before the two SRB' motors, and the hot, supersonic exhaust flow from this main engine exhaust nozzles contains shock waves which interact with the ground, or with the launch pad structures beneath the rocket exhaust nozzles. The shock waves are then reflected back upwards, and may be reflected again from the various external solid surfaces of the main rocket casing or the SRB casings. When a shock wave eventually impinges on the external orifice of the SRB segment joint, it will exert great, momentary pressure inward through the joint crevice, forcing the seated, secondary O-ring 7 inward and unseating it; this would then negate the designed redundancy in seals.

Shock waves arise in any compressible, fluid continuum, for example in gases (Ref. 2, 3); the most familiar shock wave is the sonic "boom" caused by supersonic velocities occurring in the compressible, terrestrial atmosphere.

Shock wave theory is comparatively new in science. The theory of supercritical flow in compressible gases and fluids which gives rise to these shock waves was developed only during and after World War II (Ref. 2, 3). Shock wave theory applied to a fundamental, universal, energy-wave continuum has even more recently been applied to explain gravitation, nuclear strong and weak forces, matter and anti-matter creation and annihilation, and quantum physics phenomena generally (Ref, 4, 5, 6, 7, 8, 9).

In the present context, the compressible, fluid continuum of interest in which the shock waves form, is the hot gas of the orbiter's main, liquid-fuel rocket motor exhaust, for example, that from Challenger.

Figure 2:
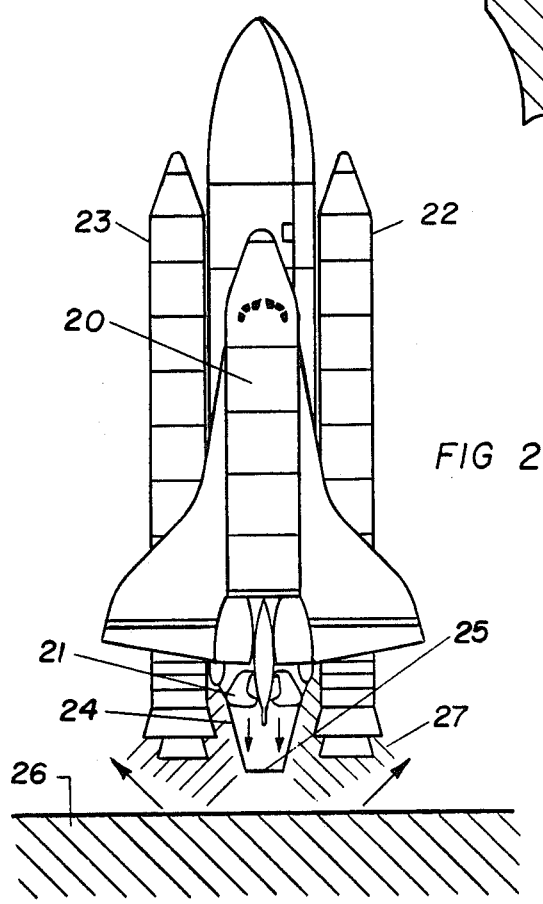
FIG. 2 shows the shock wave configuration in the engine exhaust from the orbiter's three liquid-fuel rocket motors.

When a rocket motor is ignited, the hot gases emerge from the exhaust nozzle or nozzles at supercritical (that is, at "supersonic") speeds, and shock waves are set up which can cause large increases in pressure in any narrow zone upon which the shock wave impinges. In the case of Challenger Flight 51-L, for example, depicted in FIG. 2, we have the orbiter 20, the main-engine nozzle assembly 21 of the orbiter's three liquid fuel engines, the two SRBs 22 and 23. FIG. 2 also shows the shock wave patterns formed in the engine exhaust beneath the nozzle assembly 21, consisting of an oblique shock 24 and, frequently, a shock disc 25. These shocks form externally to the engine nozzles because the pressure $p_e$ external to the nozzles, say at the ground 26, is larger than the pressure $p_n$ at the nozzles' exits. There are large, momentary pressure changes across the shock faces. The shocks 24 and 25 are reflected from the ground 26, or launch platform, back upwards as reflected shocks 27, to impinge on the SRBs 22 and 23. The reflected shocks are greatly increased in strength because of their reflection.

The amount of shock overpressure which will be produced from the start-up shocks in the orbiter's main engine exhaust, upon their being reflected from the ground or platform and then re-reflected again from the rocket motor casings, is impossible to calculate exacely from theory because of various complexities of the exhaust flow. It depends, for example, on the value to be assigned to the adiabatic exponent factor k of the exhaust gas, (Usually, for example, a value of k=1.28 is assigned for a hydrocarbon rocket fuel), on the ratio of the exhaust gas pressure at the nozzle exit to the ambient pressure on the ground or platform, on whether the shock to be reflected is a "strong" shock or a "weak" shock, on the angles of incidence and reflection of the shocks, and so on. For purposes of this invention it can be concluded that the pressure differential across the reflected shocks ranges from being approximately doubled by the reflection, to being increased by a factor of about 10. Thus, pressure surges from reflected shock waves in the main-engine exhaust, when they reach the SRB aft joint orifice, would range from about 2 atmospheres to 10 atmospheres for brief periods.

When the shock waves enter the joint crevice they may be further intensified, since the joint crevice acts to some extent as a shock tube confining the pressure surge. Such a surge could even disrupt the thermal putty 30.

It should be noted that, while the shock pressures in the exhaust plume are too complex to be calculated from theory, they are still readily measurable and recordable.

These start-up shocks from the main engine exhaust would be exerted on the outside of seated, secondary O-ring 7 in the SRB joint before the SRB rocket motor itself had been fired. In the case of Challenger, for example, this delay could be as much as 6.6 seconds.

After the SRB is itself ignited, there would be pulsating pressure waves set up on both sides of an unseated O-ring. First, on the inside of the O-ring there would now be the rocket motor's internal gas pressure, rising rapidly in value, but pulsating in frequency a few times a second, corresponding to the natural resonant frequency of the rocket motor cavity. Second, on the outside of the O-ring, there would be the impinging shock waves with a different pulsation frequency. These two opposed pressure fluctuations could result in a momentary, to-and-fro motion of the unseated O-ring taking place, this would amount to a sort of "chattering" of the unseated O-ring taking place in its seating channel for a second or so after SRB ignition, permitting blow-by of hot gas and flame.

Thus, when an SRB motor, whose secondary O-ring 7 has been unseated by the shock from the main rocket motor exhaust, itself ignited, subsequent to the main rocket motor ignition, the gas flow produced by the ignited SRB motor can momentarily encounter an open path through the segment joint crevice 1 around both unseated O-rings 5 and 7 and can reach the exterior of the joint crevice so that hot gas and flame spurt out. As is well known from the testimony at the Rogers Commission on the Challenger 51-1 accident (Ref. 1), this would permit rapid burning or thermal erosion of the rings or rings in the joint in the fraction of a second before the internal gas pressure from the rocket motor can rise and act outwardly on the primary O-ring 5 to reseat it. But, in the delay of even this fraction of a second, great erosional damage to the seal can occur, imparing the security of the seal if it reseats; or the O-ring may even burn completely through and fail.

To sum up, the described, start-up shock wave pressure was the real cause of the failure of the O-rings 5 and 7 on Challenger's aft segment joint on the right-hand SRB when puffs of smoke were observed to emerge during the first few seconds at launch. With the primary O-ring 5 having been installed unseated as described, and with the secondary O-ring 7 having been unseated by the external shock wave pressure from the main rocket motor exhaust, an open path existed for hot gas and flame to pass right through the aft joint crevice to the outside with consequent erosional damage to the primary O-ring before it reseated.

Conventional remedies for O-ring leaks are based on the theory that the rings fail to seat because of the effects of cold temperatures at launch making them unresilient, and because joint rotation, joint flexure during launch or flight, or differential wind shear pressure in flight act to unseat them ungain. (Ref. 1).

But, the cold weather experienced prior to and during launch on Jan. 28, 1986, when Challenger 51-L was destroyed, could not have been the basic cause of the O-ring failure since blow-by and partial O-ring erosional damage have occurred on previous space shuttle flights when the ambient temperatures were warm. Shock wave pressures at launch, however, occur at all temperatures.

Next, it is commonly observed (Ref. 1), after an initial blow-by of hot gas through a joint during the first few seconds following SRB motor ignition, that the smoke and gas flow then stops. This is because the designed build up of internal rocket motor gas pressure reseals the primary O-ring 5 by the pressure exerted on it from inside the motor as described above. But, the exterior, that is the secondary O-ring 7, which has been unseated by the exhaust shocks, would remain unseated. Also, the damage primary O-ring 5, while now reseated, is much more vulnerable to subsequent unseating because of its damaged condition.

Some 50 to 60 seconds into the Challenger flight 51-L, the aft joint on the right hand SRB was observed to again unseat, permitting gas and flame to spurt out through the joint crevice (Ref. 1). This second unseating is described in the Rogers Commission report as being due to joint rotation taking place at the time when the main, liquid-fuel engines are being accelerated after passage of the space shuttle through the sonic barrier. The commission report also mentions that a flexing of the rocket assemblage, caused by severe wind shear, was experienced on Flight 51-L at about this time.

Figure 3:
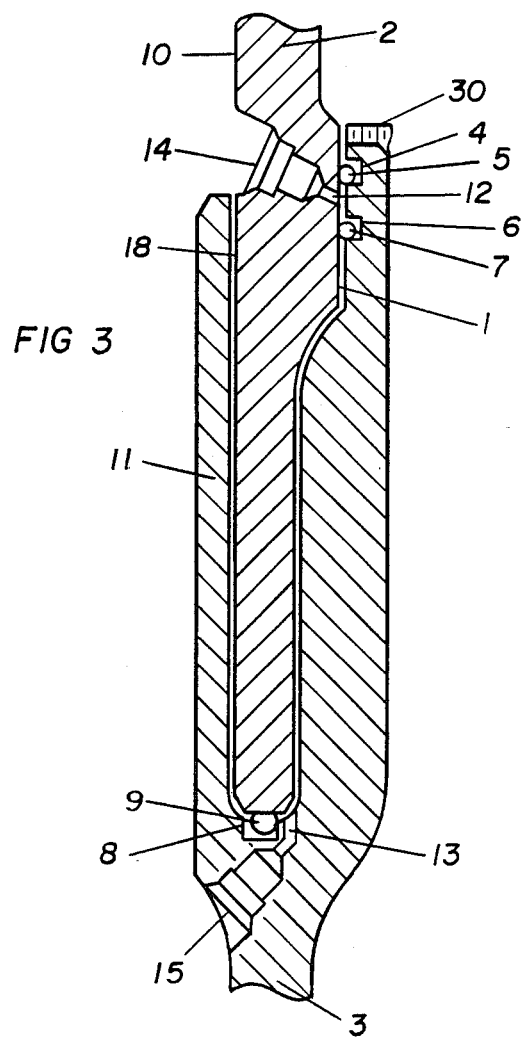
FIG. 3 shows the preferred embodiment of the invention.

Turning now from the prior art to the invention, FIG. 3 shows a preferred embodiment, in which there is a joint crevice 1, between a segment 2 of a segmented rocket motor and a segment 3, a primary or inner O-ring channel 4 and associated O-ring 5, a secondary O-ring channel 6 and associated O-ring 7, an external or outer O-ring channel 8 and associated O-ring 9, the tank 10 of segment 2 mating with the clevis 11 of segment 3, and two vent ports 12 and 13 having associated valves or cocks 14 and 15. In FIG. 3, the O-rings 5, 7 and 9 are depicted properly seated in the joint crevice 1, that is with the primary O-ring 5 and the secondary O-ring 7 being seated outwardly into the joint crevice in the direction of the exterior orifice of the crevice, and with the outermost O-ring 9 being seated inwardly into the joint crevice.

This proper seating of the O-rings 5, 7 and 9 is acomplished in this invention during rocket motor assembly by a sequenced seating operation as follows: first, a partial or complete vacuum is drawn from the joint crevice between O-rings 5 and 7 through vent port 12; this seats O-ring 5 properly outward in the joint crevice 1, but leaves O-ring 7 incorrectly seated inward. Then, through vent port 13 a partial or complete vacuum is drawn to now seat O-ring 7 correctly outward into the joint crevice and at the same time to seat O-ring 9 correctly inward into the joint crevice.

After the O-rings have been correctly seated as described, the vacuum in the joint crevice between the O-ring pairs is then relaxed to either ambient atmospheric pressure, or to some small remaining vacuum pressure as desired. The vent stoppers or vent cocks 14 and 15 are then shut.

The outermost O-ring 9 can be located at any desired point in the joint crevice which is external in the crevice to secondary O-ring 7, including the option of placing the O-ring 9 right in the external orifice 18 of the joint crevice 1; in this latter case the orifice 18 itself can form the seating channel if desired. The position of O-ring 9 shown in FIG. 3 is preferred since the unseating effects of joint rotation, which causes relative motions of tang 10 and clevis 11, are minimised at this location.

It will be obvious that an exterior encircling band or hoop made of metal, plastic, fabric, rubber, elastomer, adhesive, and the like materials, placed circumferentially around the exterior of the rocket motor casing so as to cover the joint orifice 18 completely will be equivalent to an O-ring, or other shaped gasket, of the invention if it functions to exclude external shock pressure waves from entering the joint crevice 1 and thus to protect the seating of the secondary O-ring 7; that is, such a hoop or band will be within the spirit of the invention as described.

Figure 4:
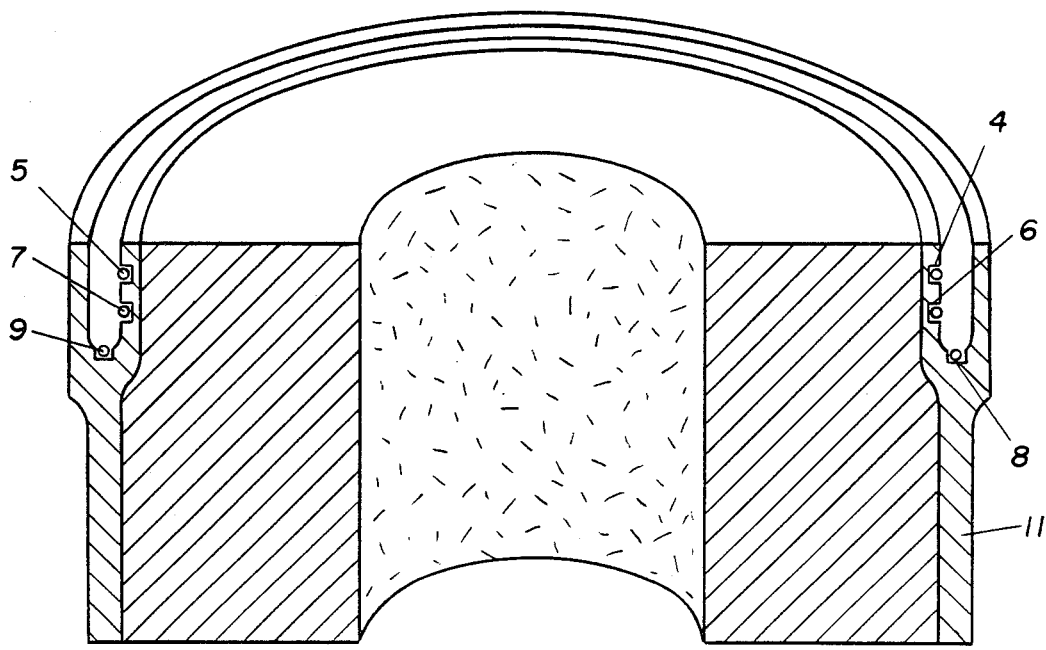
FIG. 4 shows another view of the preferred embodiment.

FIG. 4 shows a top, tilted view of the preferred embodiment of FIG. 3. It illustrates the clevis section of the joint and the location of the O-rings 5, 7 and 9 and their channels in the joint crevice, before the O-rings are seated.

It will be obvious that a simplified embodiment of the invention in which only two O-rings, say 5 and 9, are employed, in which the outer O-ring 9 is again seated inwardly into the joint crevice 1—both rings 5 and 9 being seated by means of a full or partial vacuum being drawn through a suitably disposed vent port—will still be within the spirit of the preferred embodiment of the invention using three O-rings as described above, since it will function to protect the seating of the inner O-ring 5 from being unseated by exterior shock wave pressures.

If desired, the O-rings can be seated in a slightly less desirable manner as follows: first a positive pressure (for example, 100 to 200 lbs. per sq. in.) can be applied through vent port 12 between O-rings 5 and 7; this seats O-ring 7 correctly outward into the joint crevice 1, but leaves O-ring 5, the primary O-ring, incorrectly seated inward or unseated. Second, a partial or full vacuum is drawn through vent port 13 between O-rings 7 and 9; this seats O-ring 9 correctly inward into the joint crevice 1 and at the same time reinforces the correct outward seating of O-ring 7. In this embodiment of the method, the final seating of the inner O-ring 5 is accomplished, as in Challenger, by the internal gas pressure of the rocket motor after ignition, but, in the invention, the secondary O-ring 7 is now both firmly seated and is protected against unseating from external shock pressures by the seated, outermost O-ring 9.

Obviously, the rings could be further protected in their seating by an additional pressure-excluding band placed circumferentially around the rocket motor casing over the external orifice of the joint crevice, as mentioned above.

It will be obvious that the substitution of a C-ring, or other suitably shaped ring or gasket, for the O-rings described, will be within the spirit of the invention.

It will likewise be obvious that, while the ring seating channels are shown in the preferred embodiment of FIG. 3 as being cut into the clevis of the joint, they could also be cut into the tang of the joint within the spirit of the invention.

Obviously also, within the spirit of the invention, the secondary O-ring 7 in FIG. 3 could be placed in that shown in FIG. 3 for O-ring 9, with O-ring 9 then being re-located to anywhere between said position and the external orifice 18 of the joint crevice 1.

References

1. Report of The Presidential Commission on The Space Shuttle Challenger Accident, Chairman: Wm.

P Rogers. U.S. Government Printing Office, Washington, D.C. 1986.
2. A. H. Shapiro, The Dynamics and Thermodynamics of Compressible Fluid Flow, 2 vols. John Wiley & Sons, New York 1953
3. R. Courant and K. O. Friedrichs, Supersonic Flow and Shock Waves, Interscience, New York, 1948.
4. B. A. Power, NASA Requested Proposal K-2453, Implications of a Photon Shock Wave Effect for the Fizeau Experiment on the Velocity of Light in a Moving Medium. Weather Engineering Corporation of Canada, Ltd (WECAN), Montreal, March 1980.
5. B. A. Power, Shock Waves in a Photon Gas, Contr. Paper No. 203, American Association for the Advancement of Science, Ann. Meeting, Toronto, Jan 4-8, 1981.
6. B. A. Power, Unification of Forces and Particle Production at an Oblique Radiation Shock Front. Contr. Paper No. 462, American Association for the Advancement of Science, Ann. Meeting, Washington, D.C., 3-8 Jan 1982.
7. B. A. Power, Baryon Mass Ratios and Degess of Freedom in a Compressible Radiation Flow. Contr. Paper No. 505, American Association for the Advancement of Science, Ann. Meeting, Detroit, May 1983.
8. B. A. Power, Gravitation: An Energy Compressibility Effect, Monograph, WECAN Ltd. Montreal, July 1983.
9. B. A. Power, Prediction of Elementary Particle Mass-Ratios from Compressible Flow Theory, WECAN Ltd., Montreal, May 1985.

We claim:

1. A method of sealing the joint crevice which is formed between the mating motor segment casings in a segmented rocket motor, against escape of rocket motor gas outwardly through the joint crevice to the exterior, and against ambient pressure or ambient exhaust gas pressure surges which could act inwardly through the joint crevice to unseat the joint crevice seals, said method comprising the steps of
placing two deformable, resilient, annular seal rings in two matching annular ring seating channels in the joint crevice
seating said rings into the joint crevice to positively seal it by partially or completely evacuating the air from the portion of the joint crevice located between the said rings through a vent port providing access thereto from the exterior of the casing, and then closing the vent port by a valve means, said evacuation of air thereby causing the rings to partially extrude or to flow resiliently into the joint crevice to positively seal it, with the outermost ring being thereby seated inwardly into the joint crevice to prevent the intrusion into the joint crevice of exterior air pressure surges or exhaust gas pressure surges from the exterior of the rocket casing, and with the inner ring thereby seated outwardly into the joint crevice to prevent the escape of rocket motor gas through the joint crevice from the rocket motor interior.

2. A method, as in claim 1, where there are more than two seal rings, having matching seating channels, vent ports, and valve means, and where said rings are seated into the joint crevice to positively seal it by partially or completely evacuating the air from the joint crevice portions lying between the rings and then closing off the vent ports by the valve means, working in a sequential manner by beginning with the two innermost rings and repeating the evacuation and valve closing process, working thus outwardly with each joint crevice portion lying between each set of rings, thereby causing the rings to partially extrude or to flow resiliently into the joint crevice to positively seal it, with the outermost ring being thereby left seated inwardly into the joint crevice, and with all the other rings being thereby left seated outwardly into the joint crevice.

* * * * *